United States Patent [19]
Kane et al.

[11] Patent Number: 5,297,426
[45] Date of Patent: Mar. 29, 1994

[54] HYDRODYNAMIC FLUID DIVIDER FOR FLUID MEASURING DEVICES

[75] Inventors: Martin Kane, Linwood; Mark Perelshteyn, Vineland, both of N.J.

[73] Assignee: ABB K-Flow Inc., Millville, N.J.

[21] Appl. No.: 44,349

[22] Filed: Apr. 7, 1993

[51] Int. Cl.⁵ .......................... G01F 5/00; G01F 1/84
[52] U.S. Cl. ...................... 73/202; 73/861.38
[58] Field of Search ............ 73/202, 202.5, 861.38, 73/861.37

[56] References Cited
U.S. PATENT DOCUMENTS

| | | | |
|---|---|---|---|
| 2,067,645 | 1/1937 | Pinkerton | 73/202.5 |
| 3,251,226 | 5/1966 | Cushing | 73/861.18 |
| 3,559,482 | 2/1971 | Baker et al. | 73/202 X |
| 3,927,565 | 12/1975 | Pavlin et al. | 73/194 M |
| 3,981,202 | 9/1976 | Spangle | 73/438 |
| 4,217,774 | 8/1980 | Agar | 73/32 A |
| 4,653,332 | 3/1987 | Simonsen | 73/861.38 |
| 4,760,744 | 8/1988 | Simonsen et al. | 73/861.38 |
| 4,798,091 | 1/1989 | Lew | 73/861.38 |
| 4,811,606 | 3/1989 | Hasegawa et al. | 73/861.38 |
| 4,823,614 | 4/1989 | Dahlin | 73/861.38 |
| 4,829,832 | 5/1989 | Lew | 73/861.38 |
| 4,831,885 | 5/1989 | Dahlin | 73/861.38 |
| 5,048,349 | 9/1991 | Wolff | 73/861.37 |
| 5,143,257 | 9/1992 | Austin et al. | 222/57 |

*Primary Examiner*—Herbert Goldstein
*Attorney, Agent, or Firm*—Seidel, Gonda, Lavorgna & Monaco

[57] ABSTRACT

A hydrodynamic fluid divider is provided whereby by a shunt line directs a portion of the overall flow of a defined fluid stream through a flow measuring device, such as a Coriolis mass flow meter. The proportion of the shunt line flow portion is determined by the relationship of various fluid restrictions within the shunt line and the main line of the divider. The measured flow value for the shunt line flow is utilized along with a scale-up factor to determine the overall flow through the divider. The proportional relationship of the shunt line to the overall flow permits a reduction in the size and operational requirements for the flow measuring device.

20 Claims, 4 Drawing Sheets

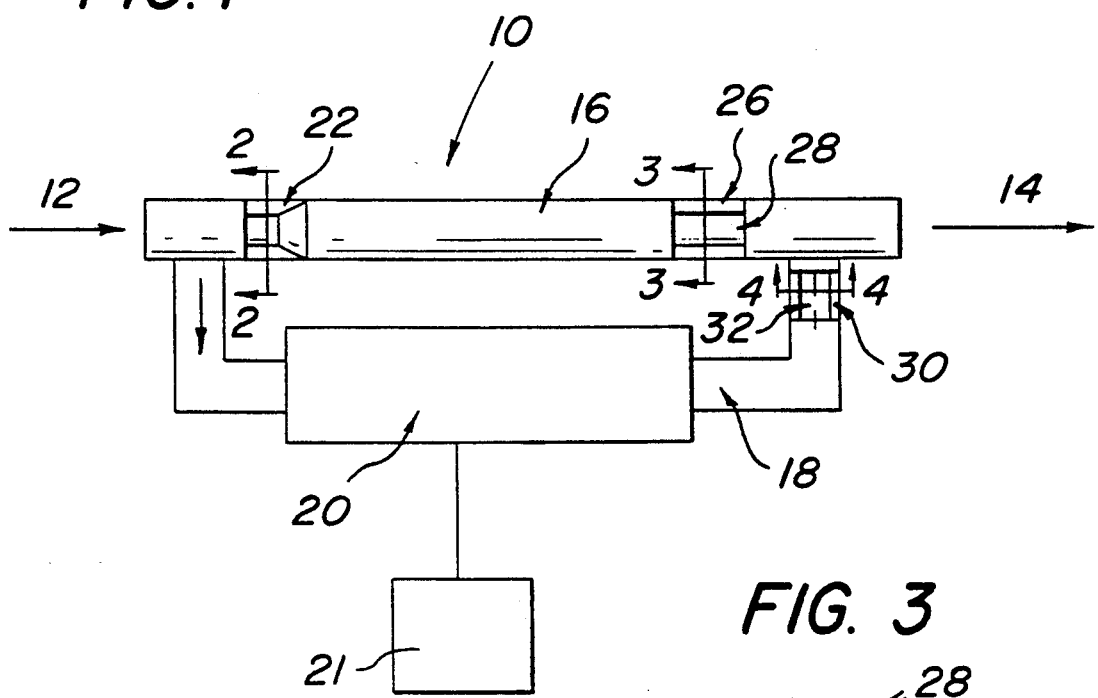
FIG. 1
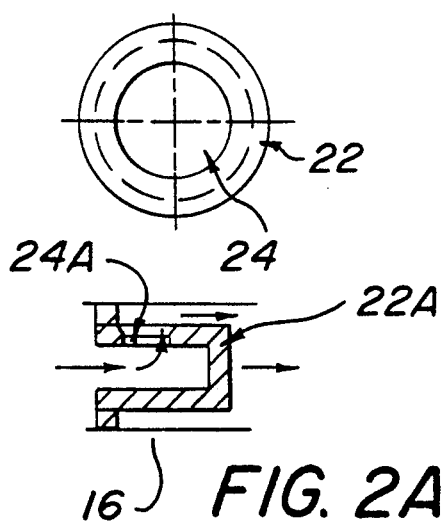
FIG. 2
FIG. 2A
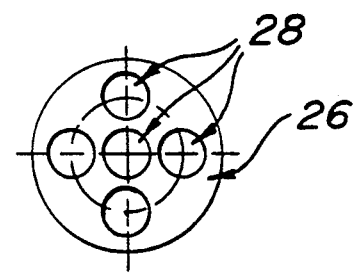
FIG. 3
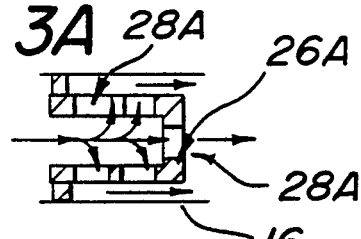
FIG. 3A
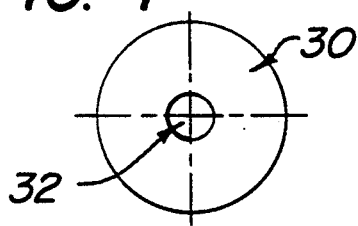
FIG. 4
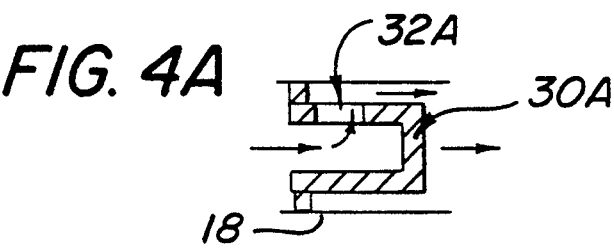
FIG. 4A

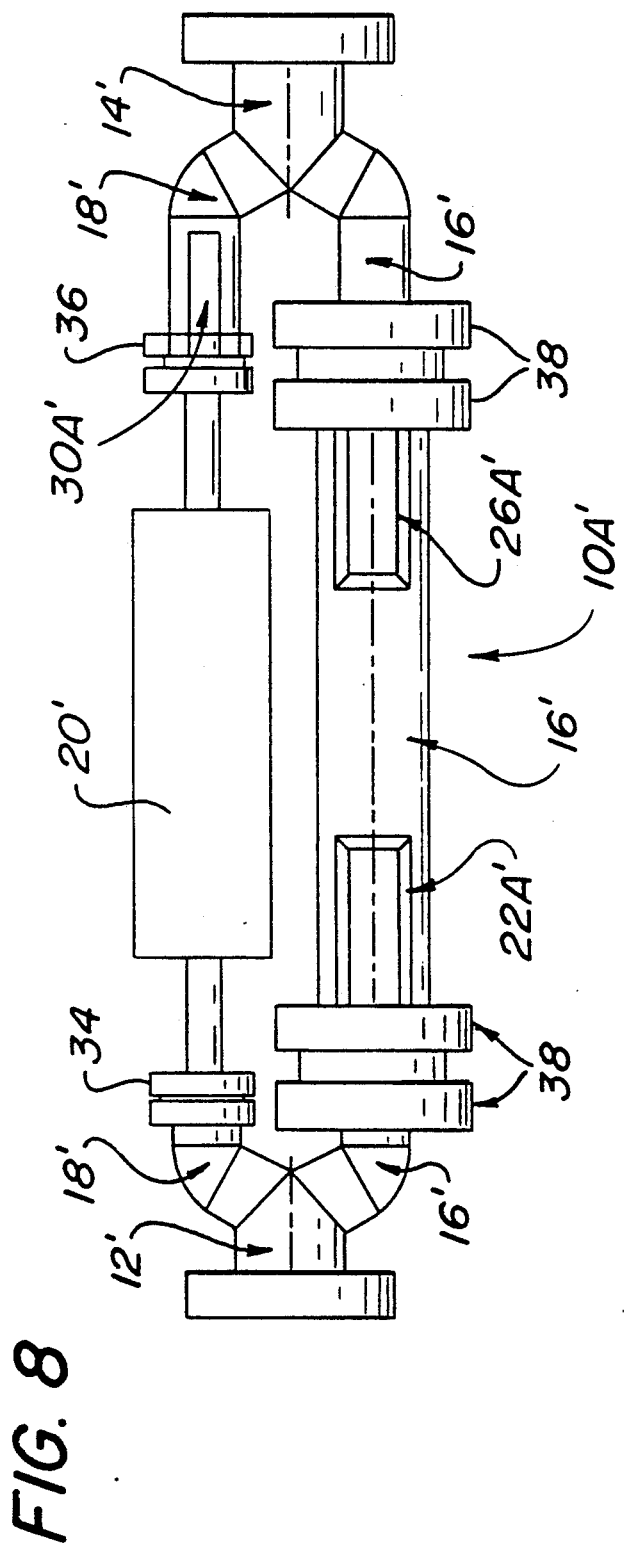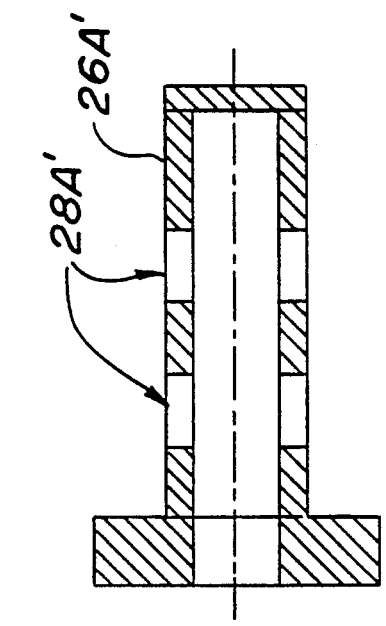
FIG. 8
FIG. 9

HYDRODYNAMIC FLUID DIVIDER FOR FLUID MEASURING DEVICES

FIELD OF THE INVENTION

The present invention relates to a hydrodynamic fluid divider for use along with a device for measuring the flow characteristics of liquids, gases and the like. The measuring device may measure the mass, volume or other characteristic of the flow. The function of the divider is to continuously divert a portion of the total flow and direct it through the measuring device, the diverted flow being a known portion of the total flow. The measured value of the diverted portion is then used to determine the total flow value by means of a scale-up factor which is a function of the structure of the divider.

BACKGROUND OF THE INVENTION

Although the present invention is contemplated to be applicable to any type flow measuring device, the description below will be made with reference to the operation of a Coriolis type mass flow meter. Coriolis type mass flow meters operate on the principle that a fluent material passing through a conduit or tubing, when exposed to a deflection or oscillation transverse to the direction of flow, will react with a measurable force (the Coriolis force) on the walls of the tubing. The Coriolis reaction force is generated by the material moving in an instantaneously changing curvilinear path and is directly proportional to the momentum of the material in the tubing. The Coriolis force is directed against the tubing in the opposite direction of the deflection of the flow tube on the inlet side of the deflection and with an equal and oppositely directed force on the outlet side thereof. The measurement of this reaction is used to determine the mass flow rate passing through the flow tube.

Various oscillation techniques have been employed within Coriolis mass flow meters. Certain techniques are described in U.S. Pat. No. 5,115,683 to Wayne Pratt which issued on May 26, 1992. This '683 patent (commonly assigned with the present invention) is herein incorporated by reference.

Because of the range of sensitivity of a Coriolis mass flow meter, various size tubing is utilized in order to accommodate various flow rates. For example, ABB K-Flow, Inc., the assignee of the present invention, produces a range of flow meters which are applicable to various flow rates. The selection of a specific flow meter will depend upon the operational parameters of the process and the fluid stream in which the meter is to be placed. Preferably, the least expensive meter for a particular application is selected by the purchaser. The present invention contemplates the use of relatively small meters to measure flows normally outside their maximum range of accuracy.

BRIEF SUMMARY OF THE INVENTION

The present invention relates to a hydrodynamic fluid divider adapted to be placed within a defined fluid stream or conduit having a fluid flow therein. The flow to be directed through the fluid divider may be a liquid or gas and may have varying properties. The divider generally includes an inlet for receiving the flow from the defined fluid stream and an outlet for exhausting the flow back into the fluid stream. Within the divider there is a main line for directing fluid from the inlet to the outlet and a shunt line for withdrawing a portion of the flow and for directing the flow portion to the outlet. The main line and the shunt line define separate flow paths within the divider.

Positioned within the main line and shunt line are a series of flow restricting devices and a flow measuring device. The flow restricting devices and the flow measuring device are sized in relationship to one another so as to direct a fixed portion of the overall flow through the shunt line. The flow measuring device is positioned within the shunt line to measure the characteristics of the flow through the shunt line. By fixing the flow portion through the shunt line, and thus through the measuring device, a proportional relationship to the overall flow is defined as a function of the measured value. A scale up factor is utilized to calculate the total flow through the divider as a function of the measured value of the flow characteristic as made by the measuring device.

Within one embodiment of the present invention, a balancing plate, either in the form of a nozzle plate or an orifice plate, forms a restriction to the flow in the main line. The balancing plate is positioned adjacent the inlet of the main line and includes at least one opening therein having a defines open area. The flow measuring device is positioned within the shunt line. A first restriction plate, preferably in the form of a nozzle plate, is provided in the main line downstream of the balancing plate. A second restriction plate, again preferably in the form of a nozzle, is provided downstream from the flow measuring device in the shunt line. The first restriction plate includes at least one nozzle opening therein having a defined opened area. The second restriction plate includes at least one nozzle opening therein having an open area. The overall restriction created by the flow measuring device, the balancing plate and the first and second restriction plates are arranged to create the proper flow relationship between the shunted flow and the main line flow. The relationship between the open area of the first restriction plate and the second restriction plate defines the portion of the flow directed through the shunt line and defines a scale-up factor to be applied against the measured valve from the measuring device to calculate the overall flow through the divider.

It should be noted that alternate variations of the above combination of elements are contemplated. The flow measuring device is preferably a Coriolis type mass flow measuring device; however, other type devices are contemplated. Variations in the position of the balancing and restriction plates with respect to one another and the shunt line are also contemplated. Finally, variations in the open area of the plates are contemplated as a function of the fluid properties, fluid flow rate, etc.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 shows a hydrodynamic fluid divider in accordance with the present invention.

FIG. 2 shows a cross-section of a portion of the divider shown in FIG. 1 as taken along line 2—2 therein.

FIG. 2A shows a cross-section of an alternate version of the portion of the divider shown in FIG. 2.

FIG. 3 shows a cross-section of another portion of the divider shown in FIG. 1 as taken along line 3—3 therein.

FIG. 3A shows a cross-section of an alternate version of the portion of the divider shown in FIG. 3.

FIG. 4 shows another cross-section of a portion of the divider shown in FIG. 1 as taken along line 4—4 therein.

FIG. 4A shows a cross-section of an alternate version of the portion of the divider shown in FIG. 4.

FIG. 8 shows a partial cross-section of an alternate version of the divider shown in FIG. 5.

FIG. 9 shows a cross-section of a portion of the divider shown in FIG. 8 as taken along line 9—9 therein.

DETAILED DESCRIPTION OF THE DRAWINGS

Figure 5:
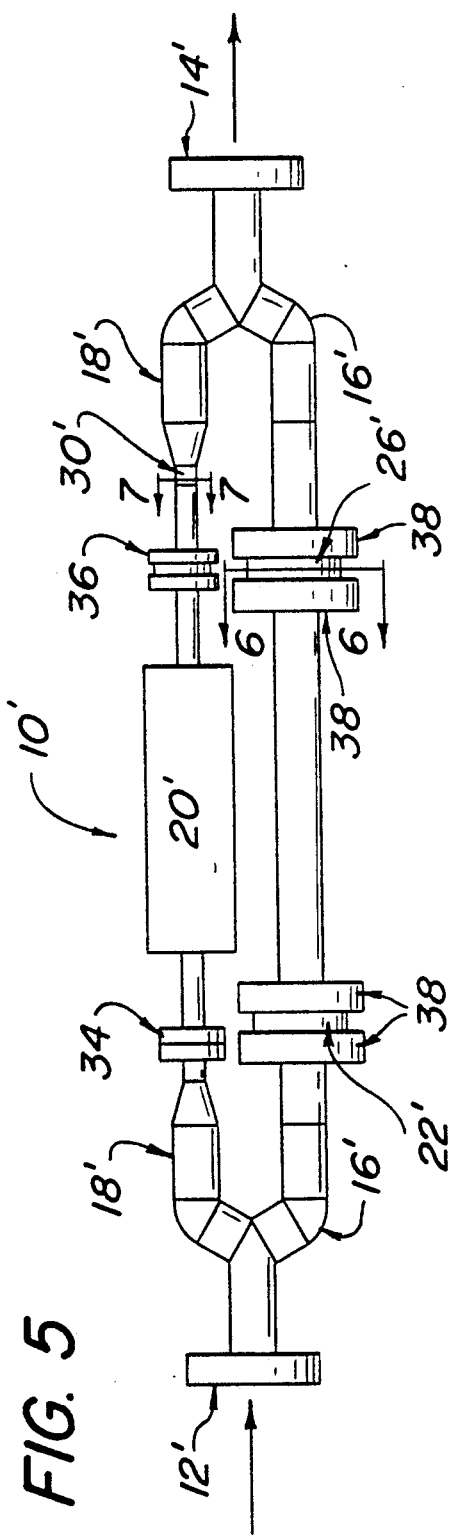
FIG. 5 shows a second embodiment of a hydrodynamic fluid divider in accordance with the present invention.

In the drawings where like numerals indicate like elements there is shown a number of embodiments of the invention as presently contemplated. The invention as generally contemplated is a hydrodynamic fluid divider which in FIG. 1 is identified generally by the numeral 10. The divider 10 includes an inlet 12 for receiving flow from a define fluid stream such as a pipeline, conduit or the like, and an outlet 14 for exhausting the flow from the divider 10 back into the define fluid stream. Within the divider 10 there is a main line conduit 16 and a shunt line conduit 18. The main line 16 directs a major portion of the overall flow from the inlet 12 toward the outlet 14. The shunt line 18 withdraws a portion of the overall flow from the inlet 12, directs the flow portion through a flow measuring device 20, and then returns the flow back into the main line 16 for exhaust through the outlet 14. As a result, the main line 16 and the shunt line 18 define separate flow paths within the divider 10 for separate portions of the overall flow traveling between the inlet 12 and the outlet 14.

Positioned within the main line 16 is a balancing plate 22 which may be in the form of an orifice plate (as illustrated) or a nozzle plate. For purposes of the present disclosure, an orifice type plate includes a cylindrical opening with an outwardly tapered portion on the downstream end. A nozzle plate includes an opening having sharp edges on the upstream end and does not include a tapered surface on the downstream end. As illustrated, the balancing plate 22 includes an opening 24 therein which is of a smaller diameter than the inside diameter of the conduit forming the main line 16. The balancing plate 22 is more particularly shown in FIG. 2. As illustrated in cross section, opening 24 includes a cylindrical part extending for a portion of the thickness of the plate 22 and a outwardly tapered part on the down stream side of the plate 22.

As expressed above, other type openings 24 are contemplated for use in the balancing plate 22. These alternative structures include those having either a cylindrical portion or an outwardly tapered portion. It is further contemplated that the balancing plate 22 may define a square-edged or sharp-edged orifice 24. Multiple openings may be provided in the balancing plate 22 depending on the parameters of the flow and the form of the divider 10. As illustrated in FIG. 2A, the balancing plate 22A may be formed by a cylindrical extension within the center of the main line conduit 16. The opening 24A is provided on the cylindrical surface of the plate 22A. This alternate version of the balancing plate 22A may also be varied as to the form of the opening 24A and/or the number of openings.

The size of the opening 24 in balancing plate 22 is preferably defined in relation to the restriction on the flow created by the flow measuring device 20. For example, if the flow measuring device is a Coriolis mass flow meter having two flow tubes which have an approximate flow tube diameter of 0.194 inches, a total cross-sectional area of approximately 0.05908 square inches is provided for the flow by the meter 20. The orifice opening 24 preferably includes a substantially equivalent cross-sectional area as that created by the flow measuring device 20. Also, the length of the balancing plate 22 maybe varied to equate its restriction with that of the measuring device 20. The intent is to substantially mimic the effect of the flow measuring device 20. This will result in a substantially equivalent pressure drop across the balancing plate 22 as that created by the flow measuring device. Also, a velocity balance across the holes 24 in the balancing plate 22 and the flow tube(s) of the flow measuring device 20 is preferably created. This velocity balance is the result of the flow having a substantially equivalent velocity profile through the balancing plate 22 as that created through the flow tubes of the meter 20.

As indicated previously, the flow measuring device 20 is preferably a Coriolis mass flow meter. Such Coriolis mass flow meters may be similar to those manufactured by ABB K-Flow, Inc. of Millville, N.J. The meter 20 includes a suitable controller 21 for calculating the mass flow rate through shunt line 18 and for making other calculations.

Also positioned within the main line 16 is a first restriction plate 26, which is preferably in the form of a nozzle. In a nozzle plate, as compared to a standard orifice such as the orifice shown as balancing plate 22, a fixed length to diameter ratio is identified. In restriction plate 26, as contemplated by the present invention, the L/D ratio is 5 to 1. A second restriction plate 30 is provided within shunt line 18 adjacent to its outlet communication with main line 16. The second restriction plate 30 is also preferably a nozzle type plate.

The first restriction plate 26 is more particularly illustrated in FIG. 3. The second restriction plate 30 is illustrated in FIG. 4. As can be seen from these FIGS. 3 and 4, the nozzle openings 28 and 32, respectively, have the generally same cross-sectional area. The first restriction plate 26 includes five openings 28 while the second restriction plate includes a single nozzle opening 32. It is contemplated that this relationship of 5 to 1 will direct 1/6th of the total flow through the shunt line 18 and 5/6th of the total flow through main line 16. This flow relationship defines a scale-up factor for the measurements of the flow measuring device 20. Thus, a reading on the flow measuring device will identify the measured characteristics for 1/6th of the overall flow through the fluid divider 10. This measured value when multiplied by the scale-up factor provides an accurate identification of the overall flow through the divider 10.

As illustrated in FIGS. 3A and 4A, the restriction plates 26 and 30 may be replaced by cylindrical nozzles 26A and 30A, respectively. The cylindrical nozzles 26A and 30A include sharp-edge openings and form an overall restriction on the flow similar to those particularly shown in FIGS. 3 and 4. As shown in FIG. 3A, the multiple openings 28A in the cylindrical plate may be positioned around the periphery of the plate and/or in the end of the plate.

Figure 7:
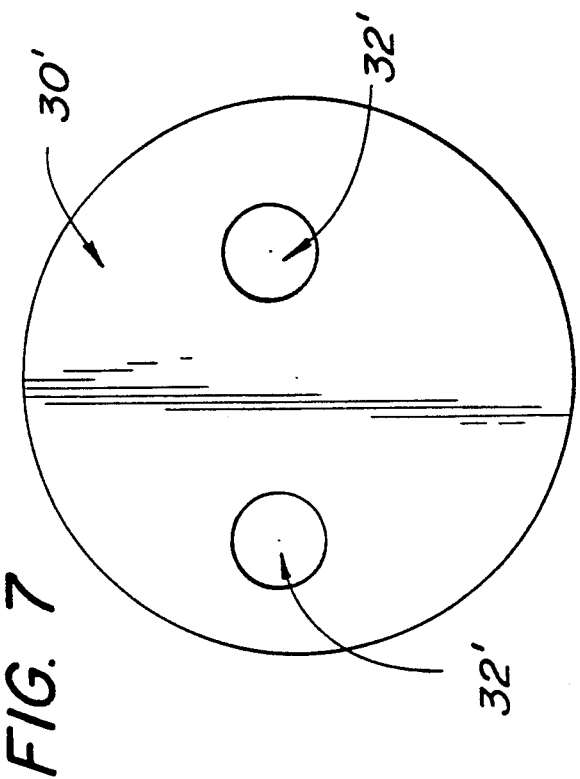
FIG. 7 shows a second cross-section of a portion of the divider shown in FIG. 5 as taken along line 7—7 therein.
Figure 6:
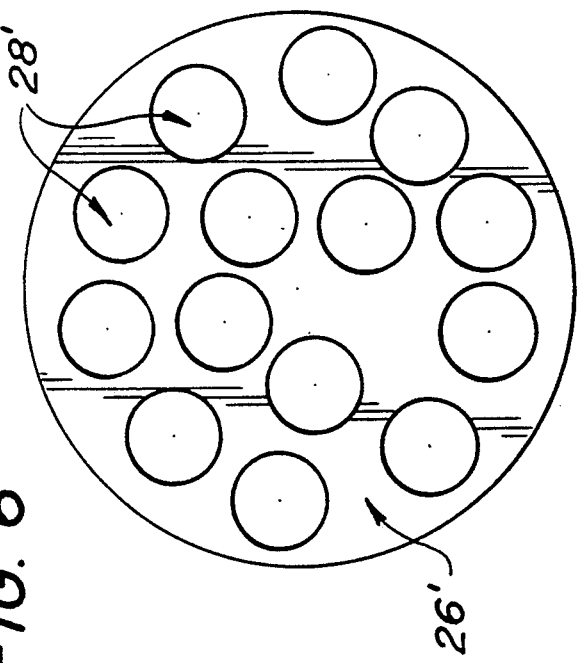
FIG. 6 shows a partial cross-section of the divider shown in FIG. 5 as taken along line 6—6 therein.

In FIGS. 5-7, there is illustrated an alternate embodiment of the fluid divider of the present invention. The divider embodiment in FIG. 5 is generally identified by the numeral 10'. Fluid divider 10' includes an inlet 12' which is generally in the form of a manifold. The outlet 14' is also formed as a manifold. The inlet manifold 12' deflects a portion of the flow into the shunt line 18' and the remaining portions of the flow in the opposite direction toward the main line 16'. The first restriction plate 26' is positioned within the main line 16' between the inlet manifold 12' and outlet manifold 14'. The first restriction plate 26' is inserted into the main line 16' between adjacent flanges 38. The flow measuring device 20' is positioned within the shunt line 18' by flanges 34 and 36, respectively, and upstream of the second restriction plate 30'.

As illustrated in FIG. 6, the first restriction plate 26' includes fourteen nozzle openings 28'. As illustrated in FIG. 7, the second restriction plate 30' includes two nozzle openings 32'. Each of the nozzle openings 28' in the first restriction plate 26' have the same area as the nozzle openings 32' in second restriction plate 30'. The relationship of the total area of the openings 32' to the total area for the openings in both restriction plates 26' and 30' substantially define the portion of the overall flow characteristic being directed through the flow measuring device 20' and shunt line 18'. Based on this relationship, a scale-up factor may be defined to determine the overall flow through the divider 10' as a function of the measurements of the flow measuring device 20'.

In FIGS. 8 and 9, there is illustrated an alternate version of the fluid divider 10' as illustrated in FIGS. 5-7. This alternate version of the divider, identified as 10A', includes a cylindrical orifice plate as the balancing plate 22A' and a cylindrical nozzle plate for first restriction plate 26A' and second restriction plate 30A'. Ilustrated in FIG. 9 is the first restriction plate 26A' having a series of nozzle openings 28A' therein. The second restriction plate 30A' is formed similarly as plate 26A'. The opening(s) in the first restriction plate (not shown) define, in conjunction with the openings 28A' in plate 26A', the relative flows between the shunt line 18' and the main line 16'.

Figure 10:
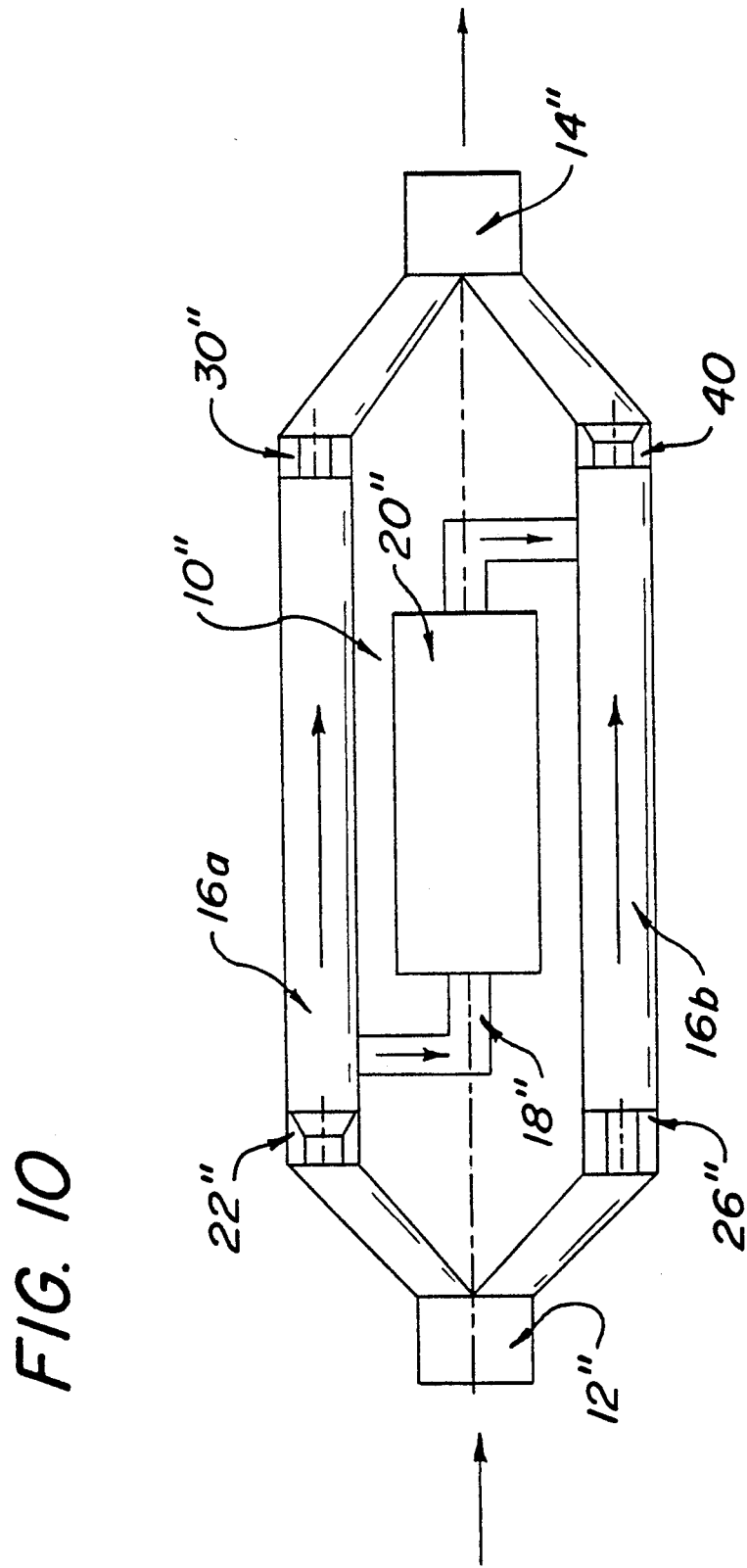
FIG. 10 shows a still further alternate embodiment of the hydrodynamic fluid divider of the present invention.

In FIG. 10 there is illustrated an alternate embodiment of the contemplated invention with the fluid divider being generally identified as 10". The fluid divider 10" includes an inlet manifold 12" and an outlet manifold 14". the inlet manifold 12" receives the flow from the define fluid stream and splits the flow into two portions. The flow split performed by the inlet manifold 12" defines two main line portions 16a and 16b. A shunt line 18" directs a portion of the flow from main line 16a through a flow measuring device 20" and exhausts the portion of the flow back into the second main line 16b. Upstream of the inlet to shunt line 18" is provided a first balancing plate 22". Again, the balancing plate 22" may be in the form of an orifice plate—as shown—or a nozzle plate or a similar restrictions element. The first balancing plate 22" is positioned within the first main line 16a. Opposite of the first balancing plate 22" and within the second main line 16b is a first restriction plate 26" which is illustrated as a nozzle. The first restriction plate 26" is positioned upstream of the outlet from the shunt line 18" into the second main line 16b. Downstream of the outlet of the shunt line 18" within main line 16b is a second balancing plate 40. Opposite the second balancing plate 40 and within main line 16a is a second restriction plate 30", also shown as a nozzle plate. The second restriction plate 30" is positioned within the first main line 16a downstream of the inlet to the shunt line 18" and the first balancing plate 22". The flows directed through the second balancing plate 40 and the second restriction plate 30" are directed into the outlet manifold 14" and back into the define fluid stream.

It is contemplated in divider 10" that the restriction formed by the first balancing plate 22" and that of the second balancing plate 40 will be substantially equivalent. The flow into balancing plate 22" (passing through the mainfold 12") is contemplated to be slightly greater than the flow through the first restriction plate 26". The flow through the second balancing plate 40 is contemplated to be the sum of the flow through line 16a plus the output flow from the shunt line 18". Also, the restriction formed by the first restriction plate 26" and the second restriction plate 30" will be substantially equal. The restriction of the plates 26" and 30" is contemplated to be greater than that created by the balancing plates 22" and 40. As a result, the flow through the first restriction plate 26" (input from manifold 12") will be equal to the flow through balancing plate 22" less the flow portion directed into shunt line 18". Thus, a pressure and velocity balance exists between the two main lines 16a, 16b downstream of the inlet to shunt line 18" in main line 16a and upstream of the output of the shunt line 18" into main line 16b.

In defining the operation of the present invention, certain parameters will be required to be tested in order to identify a preferred operating range for a specific fluid. Variations in the structures are contemplated, including the size and number of openings within the balancing plate and the size and number of openings in the first and second restriction plates. Moreover, the positioning of orifice plates and nozzle plates may vary depending on flow conditions. For example, the arrangement shown in FIGS. 1-4 may be altered such that the first restriction plate 26 is positioned in the main line 16 upstream of the outlet of the shunt line 18. Moreover, orifice plate 22 may possibly be positioned downstream of the inlet to the shunt line 18.

As an example of the operation of the contemplated invention, the following numerical values have been identified. First, a K-40 type Coriolis mass flow meter a manufactured by ABB K-Flow, Inc. of Millville, N.J. is inserted into a divider such as divider 10 in FIG. 1. The K-40 mass flow meter serves as the flow measuring device 20. The K-40 type flow meter generally includes two flow meter tubes therein, each having a internal diameter of 0.194". This creates a total cross-sectional area of 0.05908 square inches. The orifice opening in balancing plate 22 generally includes the same cross-sectional area by providing twenty orifice openings 24 each having a diameter of 0.1935 inch.

In a typical K-40 type flow meter, the work point flow rate is defined as a function of the maximum mass flow rate through the meter (40 pounds per minute) divided by a working pressure factor. The preferred working flow rate is between 26 an 27 pounds per minute. If the overall flow rate into the divider 10 is contemplated to be approximately 450 pounds per minute, this would define a maximum scale-up factor of 16.9. This calculated scale-up factor is defined as a function of the overall flow rate divided by the preferred flow rate through the measuring device.

In actual testing, the first restriction plate 26 included ten nozzle openings each having a diameter of 0.1935 inch. The second restriction plate 30 included a single nozzle opening 32 also having a 0.1935 inch diameter. The divider was tested against a larger Coriolis flow meter for calibration of the scale-up factor. In such a arrangement, the linear portion of the flow, being within the defined flow rate parameters for accuracy for a particular application, falls in the range approximately between 8 lbs./min. and 26 lbs./min. The scale-up factor in this range was determined to be approximately 14.8. This provides a percent error, as compared to measurements of the larger Coriolis mass flow meter, f approximately 1% or less. For a number of applications, this error is acceptable.

As can be seen by the above data, it is contemplated that the structure of the present invention may vary greatly depending on the type of fluid (including gases and liquids), the form of the flow meter functioning as the measuring device, the size of the measuring device, the pressure drop created by the flow measuring device (as well as that of the other restrictions within the divider), and the size of the orifice opening and nozzle openings within the main line and shunt line. The fact that the calculated scale-up factor of 14.8 occurred in the above examples as a result of a 30 to 1 ratio of openings in the first and second restriction means is attributed to the holes on the test divider being formed by a drill press which was imprecise. Moreover, it is contemplated that the results of the present invention may be achieved analytically despite the ratio being defined by other than the ratio of the holes. Thus, a specific structural arrangement for a an application can be made by one of skill in the art through the use of the above defined relationships and by verifying the scale-up factor by testing. The accuracy and the scale-up factor may also be determine by actual testing and by line calculations performed by the flow meter or otherwise. Thus, the examples expressed above are for illustration purposes only and do not reflect a limitation on the scope of the invention as presently contemplated.

The present invention may be embodied in other specific forms without departing from the spirit or essential attributes thereof, and accordingly, reference should be made to the appended claims, rather than to the foregoing specification, as indicating the scope of the invention.

We claim:

1. A hydrodynamic fluid divider comprising:
   an inlet for receiving fluid flow;
   an outlet for exhausting fluid flow;
   a main line for directing fluid flow from the inlet to the outlet;
   a shunt line for withdrawing a portion of the flow from the inlet and directing the flow portion to the outlet separately from the flow in the main line;
   a balancing plate positioned in the main line having at least one opening therein for passage of at least a portion of the fluid flow from the inlet, through the main line, and into the outlet;
   means for measuring flow characteristics within the shunt line;
   a first restriction plate positioned downstream of the balancing plate within the main line; and
   a second restriction plate positioned downstream of the flow measuring means within the shunt line,
   the first restriction plate having at least one opening therein, and the second restriction plate also having at least one opening therein, the open area of the second restriction plate opening with respect to the total area of first restriction plate opening and the second restriction plate opening being proportional to the portion of the overall fluid flow directed through the shunt line and the flow measuring means and the balancing plate form equivalent restrictions on the fluid flow through the shunt line and the main line, respectively.

2. A hydrodynamic fluid divider as claimed in claim 1, wherein the balancing plate is formed as an orifice plate.

3. A hydrodynamic fluid divider as claimed in claim 2, wherein the balancing plate is formed as a cylindrical orifice plate.

4. A hydrodynamic fluid divider as claimed in claim 1, wherein the first and second restriction plates are formed as nozzle plates.

5. A hydrodynamic fluid divider as claimed in claim 1, wherein the first restriction plate is formed as a cylindrical nozzle.

6. A hydrodynamic fluid divider as claimed in claim 1, wherein the inlet to the shunt line is positioned upstream of the balancing plate.

7. A hydrodynamic fluid divider as claimed in claim 1, wherein the inlet is formed by a manifold which splits the input fluid flow between the main line and the shunt line, and the outlet is in the form of a manifold which receives the fluid flow from the main line and the shunt line and outputs the combined fluid flow.

8. A hydrodynamic fluid divider as claimed in claim 7, wherein the first nozzle plate is positioned within the main line upstream of the discharge manifold and the second nozzle plate ia positioned within the shunt line upstream of the discharge manifold.

9. A hydrodynamic fluid divider as claimed in claim 1, wherein the second nozzle plate is positioned downstream from the flow measuring means.

10. A hydrodynamic fluid divider as claimed in claim 1 wherein the first and second restriction plates are formed as cylindrical nozzles.

11. A hydrodynamic fluid divider as claimed in claim 1 through 9 wherein the flow measuring means comprises a Coriolis mass flow meter.

12. A hydrodynamic fluid divider comprising:
    an inlet manifold for receiving fluid flow;
    an outlet manifold for exhausting fluid flow from the divider;
    a main line for directing fluid flow from the inlet manifold to the outlet manifold;
    a shunt line for directing a portion of the fluid flow independent of the main line;
    means for measuring flow characteristics within the shunt line;
    first restriction means positioned within the main line;

second restriction means positioned within the shunt line downstream of the flow measuring means, the first restriction means having more than one opening therein, the second restriction means having at least one opening therein, the open area of the opening in the second restriction means being equal to the area of each opening in the first restriction means and the ratio of the number of second restriction means openings to the total number of openings in the first restriction means and the second restriction means defining the portion of the flow directed through the shunt line.

13. A hydrodynamic fluid divider as claimed in claim 12, further comprising balancing means within the main line, the balancing means for forming an equivalent flow restriction within the main line as created by the restriction of the flow measuring means within the shunt line.

14. A hydrodynamic fluid divider as claimed in claim 13, wherein the balancing means comprises an orifice plate having at least one opening therein.

15. A hydrodynamic fluid divider as claimed in claim 14, wherein the orifice plate comprises a cylindrical plate.

16. A hydrodynamic fluid divider as claimed in claim 12, wherein the flow measuring means comprises a Coriolis mass flow meter for measuring the mass flow rate of the fluid flow directed through the shunt line and means for calculating the total mass flow rate through the divider in conjunction with a scale-up factor defined at least in part by the open area of the openings within the first restriction means and the second restriction means.

17. A hydrodynamic fluid divider comprising:
an inlet manifold for receiving a fluid flow and dividing the fluid flow into two separate portions;
an outlet manifold for receiving two flow portions, combining the flow portions, and exhausting the flow into a define fluid stream;
a first and second main line portion each receiving one flow portion from the inlet manifold and directing the received flow portion into the outlet manifold;
a shunt line communicating at opposite ends with the first and second main line portions, the shunt line withdrawing a portion of the flow from the first main line portion and directing the withdrawn flow portion to the second main line portion;
a first balancing plate positioned within the first main line portion upstream of the inlet to the shunt line;
a second balancing plate positioned in the second main line downstream of the outlet of the shunt line, the restriction of the flow by the first balancing plate and the second balancing plate being substantially equal;
means for measuring the characteristics of the withdrawn flow portion within the shunt line;
a first restriction plate having at least one nozzle opening therein and positioned upstream of the outlet of the shunt line into the second main line;
a second restriction plate positioned within the first main line downstream of the first balancing plate and downstream of the inlet to the shunt line,
a hydrodynamic balance being created by the first and second restriction plates so as to direct a fixed portion of the overall flow through the shunt line; and
means for calculating the characteristics of the overall flow through the divider as a function of the portion of the flow through the shunt line as determined by the measuring means.

18. A hydrodynamic fluid divider as claimed in claim 17, wherein the first or second balancing plates are formed as orifice plates.

19. A hydrodynamic fluid divider as claimed in claim 17, wherein the measuring means within the shunt line comprises a Coriolis mass flow meter.

20. A hydrodynamic fluid divider as claimed in claim 17, wherein the first and second restriction means are formed as nozzle plates.

* * * * *